US012300264B2

(12) United States Patent
Schroeder et al.

(10) Patent No.: US 12,300,264 B2
(45) Date of Patent: May 13, 2025

(54) EXTRACTION OF AN AUDIO OBJECT

(71) Applicant: Lawo Holding AG, Rastatt (DE)

(72) Inventors: Leon Schroeder, Rastatt (DE); Jonathan Ziegler, Rastatt (DE)

(73) Assignee: LAWO HOLDING AG, Rastatt (DE)

( * ) Notice: Subject to any disclaimer, the term of this patent is extended or adjusted under 35 U.S.C. 154(b) by 336 days.

(21) Appl. No.: 17/887,140

(22) Filed: Aug. 12, 2022

(65) Prior Publication Data

US 2022/0383894 A1 Dec. 1, 2022

Related U.S. Application Data

(63) Continuation of application No. PCT/EP2021/052776, filed on Feb. 5, 2021.

(30) Foreign Application Priority Data

Feb. 14, 2020 (DE) ..................... 10 2020 000 974.3

(51) Int. Cl.
*G10L 21/055* (2013.01)
*H04S 7/00* (2006.01)

(52) U.S. Cl.
CPC .............. *G10L 21/055* (2013.01); *H04S 7/30* (2013.01); *H04S 2400/11* (2013.01)

(58) Field of Classification Search
CPC ......... G10L 21/055; G10L 25/30; H04S 7/30; H04S 2400/11; H04R 29/005
See application file for complete search history.

(56) References Cited

U.S. PATENT DOCUMENTS 9,979,499 B2 5/2018 Oldfield et al.

FOREIGN PATENT DOCUMENTS

CN 110534127 A 12/2019

OTHER PUBLICATIONS

Oldfield, R. et al "Object-based audio for interactive footbal broadcast" in: multimed tools, appl, vol. 74, 2015, pp. 2717-2741, ISSN: 1573-7721.
International Search Report dated May 6, 2021 in corresponding application PCT/EP2021/052776.
Luo Yi et al: "FaSNet: Low-Latency Adaptive Beamforming for Multi-Microphone Audio Processing" 2019 IEEE Automotive Speech Recognition and Understanding Workshop, Dec. 14, 2019, pp. 260-267, DOI: 10.1109/ASRU46091.2019.9003849.

*Primary Examiner* — David L Ton
(74) *Attorney, Agent, or Firm* — Muncy, Geissler, Olds & Lowe, P.C.

(57) ABSTRACT

A method for extracting at least one audio object from at least two audio input signals, each of which contains the audio object. The second audio input signal is syncronized with the first audio input signal while obtaining a synchronized second audio input signal. The audio object is extracted by applying at least one trained model to the first audio signal and to the synchronized second audio input signal. The audio object is outputted. Further, the step of synchronizing the second audio input signal with the first audio input signal includes the steps of: generating audio signals; analytically calculating a correlation between the audio signals; optimizing the correlation vector; and determining the synchronized second audio input signal using the optimized correlation vector.

19 Claims, 3 Drawing Sheets

EXTRACTION OF AN AUDIO OBJECT

This nonprovisional application is a continuation of International Application No. PCT/EP2021/052776, which was filed on Feb. 5, 2021, and which claims priority to German Patent Application No. 10 2020 000 974.3, which was filed in Germany on Feb. 14, 2020, and which are both herein incorporated by reference.

BACKGROUND OF THE INVENTION

Field of the Invention

The present invention relates to a method for extracting at least one audio object from at least two audio input signals, each of which contains the audio object. Furthermore, the invention relates to a system for extracting an audio object and to a computer program having program code means.

Description of the Background Art

Audio objects are audio signals from objects, such as the sound of a soccer ball being kicked off, clapping sounds from an audience, or the presentation of a conversation participant. The extraction of the audio object within the meaning of the invention is accordingly the separation of the audio object from other disruptive influences which are referred to below as background noise. For example, when extracting a kick sound from a soccer game, the pure kick sound is separated, as an audio object, from the sounds of the players and the audience, so that the kick sound is finally present as a pure audio signal.

Generic methods are known from the prior art for carrying out the extraction of audio objects. A fundamental challenge is that the microphones are usually at different distances from the source of the audio object. The audio object is therefore located at different temporal positions of the audio input signals, which makes evaluation more difficult and slower.

It is known to synchronize the audio input signals in such a way that the audio object is in particular at the same temporal position of the audio input signals. This is also commonly referred to as the propagation-delay compensation. Conventional methods use neural networks in this regard. In this case, it is necessary for the neural network to be trained for all possible microphone distances from the source of the audio object. However, effective training of the neural network is not feasible, in particular in the case of dynamic audio objects, such as in the case of sporting events.

Furthermore, generic methods are known in which the correlation of the audio input signals, for example their cross-correlation, is calculated analytically for the synchronization thereof, which increases the speed of the method but impairs the reliability of the subsequent extraction of the audio object, since the correlation is always calculated independently of the type of audio object. In this case, however, effects which are disruptive to the subsequent extraction of the audio object, in particular background noise, are often amplified.

SUMMARY OF THE INVENTION

It is therefore an object of the present invention to eliminate the stated disadvantages of the prior art and in particular to improve the reliability of the extraction of the audio object while at the same time optimizing the speed of the method.

The object is achieved by a method for extracting at least one audio object from at least two audio input signals, each of which contains the audio object, the method comprising the following steps: synchronizing the second audio input signal with the first audio input signal while obtaining a synchronized second audio input signal, extracting the audio object by applying at least one trained model to the first audio signal and to the synchronized second audio input signal, and outputting the audio object, wherein the method step of synchronizing the second audio input signal with the first audio input signal comprises the following method steps: generating audio signals by applying a first trained operator to the audio input signals, analytically calculating a correlation between the audio signals while obtaining a correlation vector, optimizing the correlation vector using a second trained operator while obtaining a synchronization vector, and determining the synchronized second audio input signal using the synchronization vector.

The object is also achieved by a system for extracting an audio object from at least two audio input signals with a control unit that is designed to carry out the method according to the invention. In addition, the object is achieved by a computer program having a program code, which computer program is configured to carry out the steps of the method according to the invention when the computer program is executed on a computer or a corresponding computing unit.

The invention is based on the basic idea that the analytical calculation of the correlation, for example the cross-correlation, improves the quality of the extracted audio object, i.e., the signal separation quality of the method. Nevertheless, the formation of the first and the second trained operator creates a possibility of improving the reliability of the subsequent extraction of the audio object using trained components. In this respect, the invention represents a novel method that performs the extraction of the audio object reliably and quickly. As a result, the method can also be used with complex microphone geometries, such as large microphone distances.

The first trained operator can comprise an in particular trained transformation of the audio input signals into a feature domain in order to simplify the subsequent method steps. The second trained operator can comprise at least a normalization of the correlation vector in order to improve the accuracy of the calculation of the synchronized second audio input signal. Furthermore, the second trained operator can provide an inverse transformation of the synchronized second audio input signal relative to the transformation of the first trained operator, in particular back into the time domain of the audio input signals.

The second trained operator preferably has an in particular iterative method having a finite number of iteration steps, wherein a synchronization vector, preferably an optimized correlation vector, in particular an optimized cross-correlation vector, are determined in particular in each iteration step, which results in an acceleration of the method according to the invention. The number of iteration steps of the second trained operator can be definable on the user side in order to configure the method on the user side.

In each iteration step of the second trained operator, a stretched convolution of the audio signal with at least part of the synchronization vector, in particular of the optimized correlation vector, preferably takes place. In each iteration step, a normalization or a convolution of the synchronization vector can take place, and/or a stretched convolution of the synchronized audio input signal with the synchronization vector can take place in order to improve the signal separation quality of the method.

In a further embodiment of the invention, the second trained operator provides for the determination of at least one acoustic model function. Within the meaning of the invention, the acoustic model function corresponds in particular to the relationship between the audio object and the recorded audio input signal. The acoustic model function thus reproduces, for example, the acoustic properties of the surroundings, such as acoustic reflections (reverberation), frequency-dependent absorption, and/or bandpass effects. In addition, the acoustic model function includes in particular the recording characteristics of at least one microphone. In this respect, the compensation of undesired acoustic effects on the audio signal, caused for example by the surroundings and/or the recording characteristics of the at least one microphone, is possible by the second trained operator within the framework of the optimization of the correlation vector. In addition to the propagation-delay compensation, it is also possible to compensate for disruptive acoustic influences, for example caused by the propagation path of the sound, which improves the signal separation quality of the method according to the invention.

The trained model for extracting the audio object can provide for at least one transformation of the first audio input signal and the synchronized second audio input signal, in each case in a in particular higher-dimensional representation domain, which improves the signal separation quality. Within the meaning of the invention, the representation domain has a higher dimensionality than the usually one-dimensional time domain of the audio input signals. Since the transformations can be designed as parts of a neural network, the transformations can be trained specifically with regard to the audio object to be extracted.

The trained model of extracting the audio object can provide for the application of at least one trained filter mask to the first audio input signal and to the synchronized second audio input signal. The trained filter mask is preferably trained specifically for the audio object.

The trained model for extracting the audio object can provide at least one transformation of the audio object into the time domain of the audio input signals, in order to in particular undo a previous transformation into the representation domain.

The method steps of synchronizing and/or extracting and/or outputting the audio object are preferably assigned to a single neural network in order to allow specific training of the neural network with regard to the audio object. The reliability of the method and the signal separation quality thereof are improved overall by the configuration of a single neural network.

The neural network is preferably trained with target training data, the target training data comprising audio input signals and corresponding predefined audio objects, with the following training steps: forward propagating the neural network with the target training data while obtaining an ascertained audio object, determining an error parameter, in particular an error vector between the ascertained audio object and the predefined audio object, and changing parameters of the neural network by backward propagating the neural network with the error parameter, in particular with the error vector, if a quality parameter of the error parameter, in particular the error vector, exceeds a predefined value.

The training is geared towards the specific audio object; at least two parameters of the trained components of the method according to the invention can be mutually dependent on one another.

The method is preferably configured in such a way that it runs continuously, which is also referred to as "online operation." Within the meaning of the invention, audio input signals are continuously read in, in particular without user input, and evaluated for the extraction of audio objects. In this case, for example, the audio input signals can each be parts of in particular continuously read in audio signals having an in particular predefined length. This is also known as "buffering." Particularly preferably, the method can be designed in such a way that the latency of the method is at most 100 ms, in particular at most 80 ms, preferably at most 40 ms. Latency within the meaning of the invention is the runtime of the method, measured from the reading in of the audio input signals to the output of the audio object. The method can therefore be operated in real time.

The system according to the invention can provide a first microphone for receiving the first audio input signal and a second microphone for receiving the second audio input signal, wherein the microphones can each be connected to the system in such a way that the audio input signals of the microphones can be transmitted to the control unit of the system. In particular, the system can be configured as a component of a mixing console to which the microphones can be connected. Most preferably, the system is a mixing console. The connection of the system to the microphones can be wired and/or wireless. The computer program for carrying out the method according to the invention can preferably be executed on a control unit of the system according to the invention.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
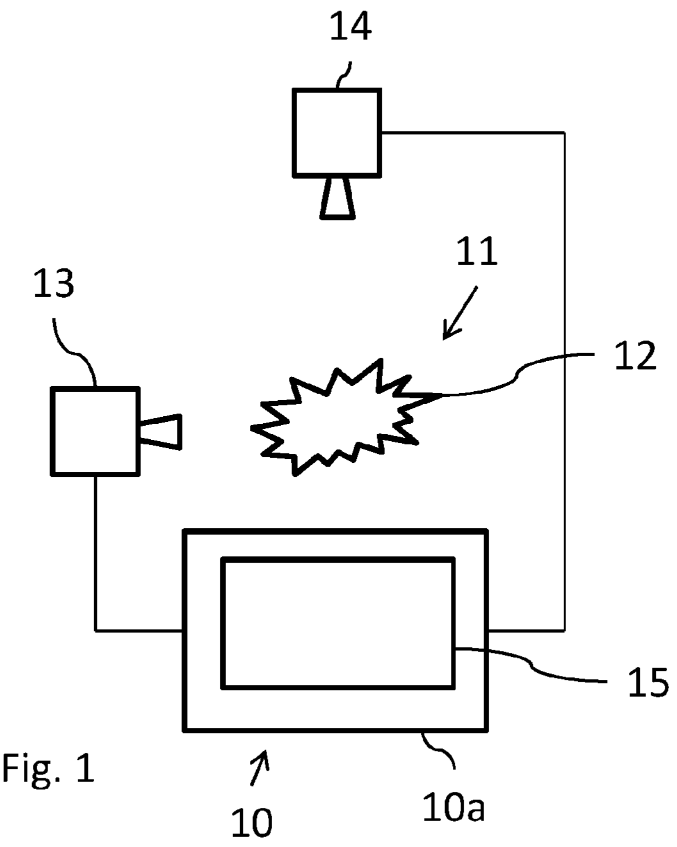
FIG. 1 is a schematic view of a system according to the invention.

FIG. 1 is a schematic representation of an embodiment of a system 10 according to the invention for extracting an audio object 11, the system 10 being a mixing console 10*a*.

Audio objects 11 within the meaning of the invention are acoustic signals that are assigned to an event and/or to an object. In the present embodiment of the invention, the audio object 11 is the sound 12 of a soccer ball (not shown in FIG. 1) being kicked.

The sound 12 is recorded by two microphones 13, 14 which each generate an audio input signal a1, a2, so that the audio input signals a1, a2 contain the sound 12. Due to the different distances between the microphones 13, 14 and the sound 12, the sound 12 is at different positions in time of the audio input signals a1, a2. In addition, the audio input signals a1, a2 differ from one another due to the acoustic properties of the surroundings and therefore also have undesired components which are caused, for example, due to the propagation paths of the sound to the microphones 13, 14, for example in the form of reverberation and/or suppressed frequencies, and are referred to within the meaning of the invention as background noise. Within the meaning of the invention, a first acoustic model function M1 reproduces the acoustic influences of the surroundings and the recording characteristics of the microphone 13 on the audio input signal a1 recorded by the first microphone 13. In this respect, the audio input signal a1 mathematically corresponds to a convolution of the sound 12 with the first acoustic model function M1. This applies analogously to a second acoustic model function M2 and to the recorded audio input signal a2 of the second microphone 14.

The microphones 13, 14 are connected to the mixing console 10*a*, so that the audio input signals a1, a2 are transmitted to a control unit 15 of the system 10, so that the control unit 15 evaluates the audio input signals a1, a2 and extracts and outputs the sound 12 for further use from the audio input signals a1, a2 extracted using the method according to the invention. The control unit 15 for extracting the audio object 11 is a microcontroller and/or a program code block of a corresponding computer program. The control unit 15 comprises a trained neural network which is in particular forward propagated with audio input signals a1, a2. The neural network is trained to extract the specific audio object 11, i.e. in the present case the sound 12, from the audio input signals a1, a2 and in particular to separate it from background noise components of the audio input signals a1, a2. Substantially, the effects of the acoustic model functions M1, M2 on the sound 12 in the audio input signals a1, a2 are compensated for.

Figure 2:
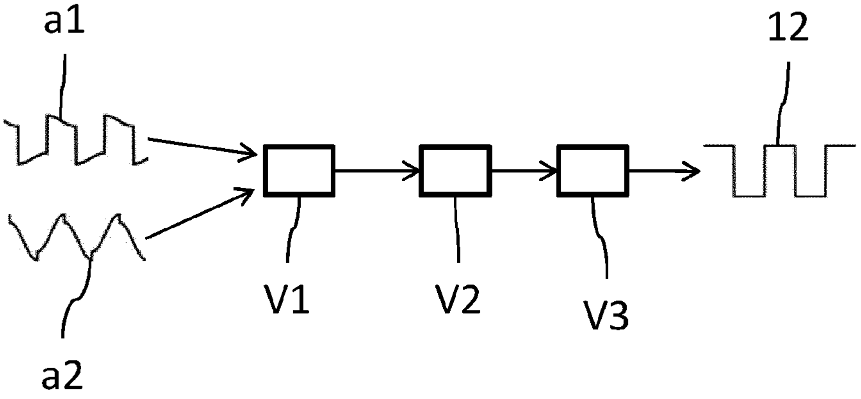
FIG. 2 is an overview of a method according to the invention in a flow chart with model signals.

FIG. 2 shows an embodiment of the method according to the invention in an overview as a flow chart with model audio input signals a1, a2 on which the method is carried out. In a first step V1, a synchronization of the second audio input signal a2 with the first audio input signal a1 takes place, so that a synchronized second audio input signal a2' is obtained as a the result. Within the meaning of the invention, the synchronized second audio input signal a2' has in particular the sound 12 at substantially the same time position as the first audio input signal a1, which significantly accelerates and simplifies the subsequent method steps. In this respect, the synchronization V1 of the audio input signals a1, a2 corresponds in particular to a compensation for the propagation time differences between the audio input signals a1, a2.

According to FIG. 2, the extraction V2 of the sound 12 takes place by applying a trained model to the first audio input signal a1 and to the synchronized second audio input signal a2', so that, as a result, the sound 12 is obtained as an audio signal. The trained model is assigned to the neural network and is trained as a part thereof for the extraction of the specific audio object 11, in this case the sound 12. In the subsequent method step, the output V3 of the sound 12 takes place as an audio output signal Z.

The method steps of synchronizing V1, of extracting V2 the sound 12 and of outputting V3 said sound are assigned to a single, trained neural network, so that the method is designed as an end-to-end method. As a result, it is trained as a whole and runs automatically and continuously, wherein the extraction of the sound takes place in real time, i.e. with a maximum latency of 40 ms.

Figure 3:
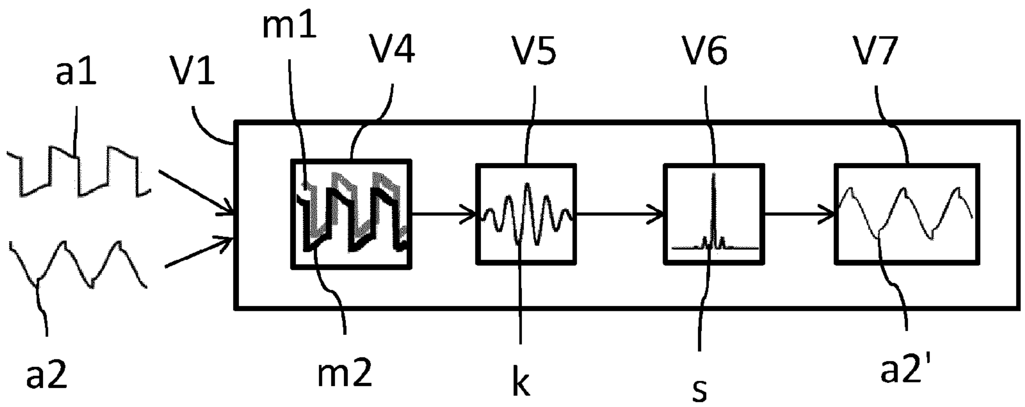
FIG. 3 is a flow chart for the method step of synchronizing audio input signals with model signals.

FIG. 3 is a flow chart of a method sequence for synchronizing V1 audio input signals a1, a2 with model audio input signals a1, a2 to show the method steps. In a first method step V4 of FIG. 3, a first trained operator of the neural network is applied to the audio input signals a1, a2 in order to generate audio signals m1, m2. In one embodiment of the invention, the audio input signals a1, a2 are transformed by the first trained operator of the neural network into a higher-dimensional feature domain in the time domain compared to the audio input signals a1, a2 for the audio signals m1, m2 in order to simplify and speed up subsequent calculations. Depending on the type of audio object 11, a processing of the audio signals m1, m2 takes place already during the transformation. FIG. 3 shows the transformed audio signals m1, m2 as a model.

In the second method step V5 of FIG. 3, the analytical calculation of the cross-correlation takes place as a correlation between the audio signals m1, m2, which correlation is mathematically defined as follows:

$$(m_1 \star m_2)[t] \triangleq \sum_{n=-\infty}^{\infty} m_1[n] m_2[n+t]$$

The calculation V5 results in a cross-correlation vector k which is shown as a model in FIG. 3. In the third method step V6, the cross-correlation vector k is optimized using a second trained operator of the neural network, wherein the calculation of the acoustic model function M takes place using the second trained operator in order to compensate for the effects thereof on the audio signals m1, m2. The second trained operator thus serves, for example, as an acoustic filter and, in the embodiment in FIG. 3, provides in particular for a normalization of the cross-correlation vector k, for example by means of a softmax function. FIG. 3 shows the synchronization vector s thus obtained as a model.

In the fourth method step in FIG. 3, the calculation V7 of the synchronized second audio input signal a2' takes place by convolving the synchronization vector s with the second audio input signal a2.

FIG. 3 shows the synchronized second audio input signal a2' as a model. In comparison to the original audio input signal a2, it can be seen that in the greatly simplified model considered here, a compensation of the propagation time delay takes place as a time offset. As already described, the synchronized second audio input signal a2' is then used for the extraction V2 of the audio object 11.

Figure 4:
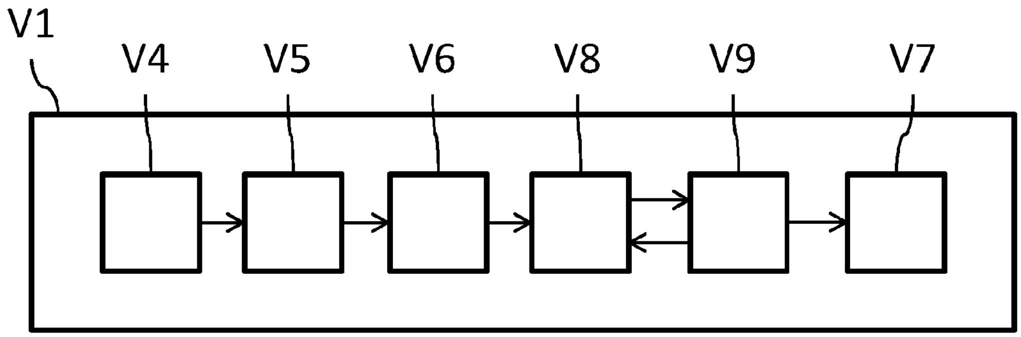
FIG. 4 is a flow chart for an iterative method of synchronization.

FIG. 4 shows a further embodiment of the synchronization V1 of the audio input signals a1, a2, in which an iterative method is provided for accelerating the calculation, the number of iteration steps I being specified on the user side. In the first iteration step, a calculation of the correlation vector between the audio signals m1, m2 takes place similarly to the method according to FIG. 3 up to the calculation V7 of the synchronized audio input signal a2', wherein the synchronization vector $s_i$ of the current iteration step i is limited in the context of the optimization V6 at each iteration step i by means of the maxpool function. Then—in each iteration step i—the calculation V8 of the iterative audio signal m2*i* for the iteration step i takes place by means of a stretched convolution which is mathematically defined as follows:

$$(a_2 *_{d_i} s)(t) = \sum_{n=-d_i}^{d_i} a_2(d_i \cdot n)s(n+t) \,|$$

The factor $d_i$ corresponds to the extent of the limitation of the cross-correlation vector for the iteration step i, with the summation taking place via the +/− the factor $d_i$. This process is repeated until the number of iteration steps I specified on the user side has been carried out. Finally, a stretched convolution V9 of the audio signal m2 with the last calculated synchronization vector $S_i$ takes place, whereupon the synchronized second audio signal a2' is calculated and output V7. The calculation of the synchronization vector s on the basis of the partial range of the parameters ascertained in the previous iteration step reduces the complexity of the calculations, which accelerates the runtime of the method without impairing the accuracy thereof.

Figure 5:
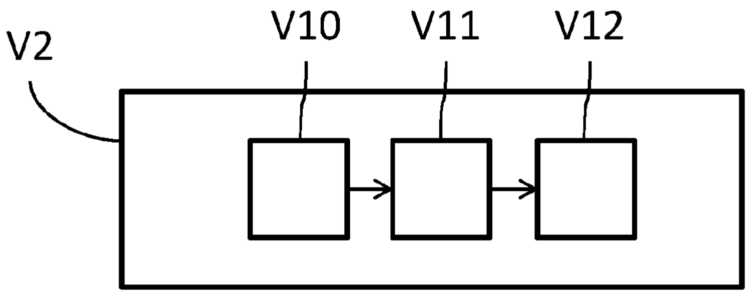
FIG. 5 is a flow chart for extracting the audio object.

FIG. 5 is a flow chart of an embodiment of the extraction V2 of the audio object 11 from the audio input signal a1 and the synchronized second audio input signal a2'. In a first method step V10, the audio input signals a1, a2' are each transformed into a higher-dimensional representation domain by applying a first trained model of the neural network in order to simplify the subsequent calculations. For example, the first trained model has a common filter bank having, in particular, a third-octave band filter bank and/or a mel filter bank, the parameters of the filters having been optimized by the previous training of the neural network.

In the second method step V11, the separation of the audio object 11 from the audio input signals a1, a2' takes place by applying a second trained model of the neural network to the audio input signals a1, a2'. The parameters of the second trained model were also optimized by the previous training and are in particular dependent on the first trained model of the preceding method step V10. As a result of this method step V11, the audio object 11 is obtained from the audio input signals a1, a2' and is still in the higher-dimensional representation domain.

In the third method step V12 of FIG. 5, the separated audio object 11 is transformed into the original, one-dimensional time domain of the audio signals a1, a2 by applying a third trained model of the neural network to the audio object 11, wherein the parameters of the third trained model are dependent on those of the other trained models and were jointly optimized by the previous training. In this respect, the third trained model of the transformation according to the third method step V12 of FIG. 5 can be seen functionally as a complement to the transformation V10 according to the first trained model. If, for example, a one-dimensional convolution is provided in the first trained model of the first method step V10, a transposed one-dimensional convolution takes place in the inverse transformation V12.

Figure 6:
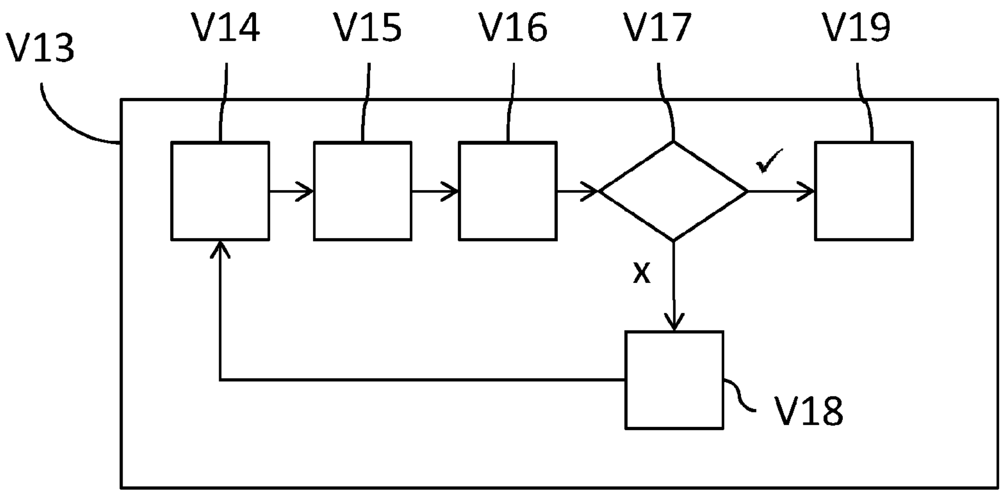
FIG. 6 is a flow chart for training the method according to the invention.

To ensure that the neural network can reliably extract the audio object 11 from the audio input signals a1, a2, it must be trained before use. This is done, for example, by the training steps V13 to V19 described below, which are shown in a schematic flow chart in FIG. 6. In the considered embodiments of the method according to the invention, the method steps mentioned are assigned to a single neural network and can each be differentiated, so that all trained components are specifically trained with regard to the audio object 11 using the training method V13 described below.

Predefined audio objects 16 are generated V14 using predefined algorithms for specified audio input signals a1, a2. The predefined audio objects 16 are always of the same type, so that the method is specifically trained with regard to one type of audio objects 16. The generated audio input signals a1, a2 run through the method according to the invention according to FIG. 2 and are in particular forward propagated by the neural network V15. The audio object 17 thus ascertained is compared with the predefined audio object 16 in order to determine V16 a mathematical error vector P on this basis. A query V17 takes place subsequently as to whether a quality parameter of the error vector P falls below a predefined value and the ascertained audio object 17 was extracted sufficiently well.

If the quality parameter exceeds the predefined value, the termination criterion is not met and the gradient of the error vector P is determined in the next method step V18 and backward propagated through the neural network, so that all parameters of the neural network are adjusted. The training method V13 is then repeated with further data sets until the error vector P reaches a sufficiently good value and the query V17 shows that the termination criterion has been met. Then the training process V13 is completed V19 and the method can be applied to real data. Ideally, the audio objects 11 used as predefined audio objects 16 in the training phase are those that are also to be ascertained in the application of the method, for example kick sounds 12 from soccer balls, which sounds have already been recorded.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for extracting at least one audio object from at least two audio input signals, each of the at least two audio input signals comprise the audio object, the method comprising:

synchronizing a second audio input signal with a first audio input signal while obtaining a synchronized second audio input signal;

extracting the audio object by applying at least one trained model to the first audio signal and to the synchronized second audio input signal; and outputting the audio object, wherein the step of synchronizing the second audio input signal with the first audio input signal comprises:

generating audio signals by applying a first trained operator to the audio input signals;

analytically calculating a correlation between the audio signals while obtaining a correlation vector;

optimizing the correlation vector using a second trained operator while obtaining a synchronization vector; and determining the synchronized second audio input signal using the synchronization vector, and wherein the second trained operator has an iterative method having a finite number of iteration steps, and wherein a synchronization vector is determined in each iteration step.

2. The method according to claim 1, wherein the first trained operator comprises a trained transformation of the audio input signals into a feature domain.

3. The method according to claim 1, wherein the second trained operator comprises at least one normalization of the correlation vector.

4. The method according to claim 1, wherein the number of iteration steps of the second trained operator is defined on the user side.

5. The method according to claim 1, wherein, in each iteration step of the second trained operator, a stretched convolution of the audio signal with at least part of the synchronization vector takes place.

6. The method according to claim 1, wherein, in each iteration step, a normalization of the synchronization vector and/or a stretched convolution of the synchronized audio input signal with the synchronization vector takes place.

7. The method according to claim 1, wherein the trained model of extracting the audio object provides for at least one transformation of the first audio input signal and the synchronized second audio input signal, in each case in a higher-dimensional representation domain.

8. The method according to claim 7, wherein the trained model of extracting the audio object provides for at least one transformation of the audio object into the time domain of the audio input signals.

9. The method according to claim 1, wherein the trained model of extracting the audio object provides for the application of at least one learned filter mask to the first audio input signal and to the synchronized second audio input signal.

10. The method according to claim 1, wherein the steps of synchronizing and/or extracting and/or outputting the audio object are assigned to a single neural network.

11. The method according to claim 10, wherein the neural network is trained with target training data, the target training data comprising audio input signals and corresponding predefined audio objects, the method comprising the following training steps:

- forward propagating the neural network with the target training data while obtaining an ascertained audio object;
- determining an error vector between the ascertained audio object and the predefined audio object; and
- changing parameters of the neural network by backward propagating the neural network with the error vector if a quality parameter of the error vector exceeds a predefined value.

12. The method according to claim 1, wherein the method is configured to run continuously.

13. The method according to claim 1, wherein the audio input signals are in each case parts of audio signals which are continuously read in and have predefined temporal lengths.

14. A method for extracting at least one audio object from at least two audio input signals, each of the at least two audio input signals comprise the audio object, the method comprising:

- synchronizing a second audio input signal with a first audio input signal while obtaining a synchronized second audio input signal;
- extracting the audio object by applying at least one trained model to the first audio signal and to the synchronized second audio input signal; and
- outputting the audio object,
- wherein the step of synchronizing the second audio input signal with the first audio input signal comprises;
  - generating audio signals by applying a first trained operator to the audio input signals;
  - analytically calculating a correlation between the audio signals while obtaining a correlation vector;
  - optimizing the correlation vector using a second trained operator while obtaining a synchronization vector; and
  - determining the synchronized second audio input signal using the synchronization vector, and
- wherein the second trained operator provides for the determination of at least one acoustic model function.

15. A method for extracting at least one audio object from at least two audio input signals, each of the at least two audio input signals comprise the audio object, the method comprising:

- synchronizing a second audio input signal with a first audio input signal while obtaining a synchronized second audio input signal;
- extracting the audio object by applying at least one trained model to the first audio signal and to the synchronized second audio input signal; and
- outputting the audio object,
- wherein the step of synchronizing the second audio input signal with the first audio input signal comprises:
  - generating audio signals by applying a first trained operator to the audio input signals;
  - analytically calculating a correlation between the audio signals while obtaining a correlation vector;
  - optimizing the correlation vector using a second trained operator while obtaining a synchronization vector; and
  - determining the synchronized second audio input signal using the synchronization vector, and
- wherein the method is configured such that the latency of the method is at most 100 ms, at most 80 ms, or at most 40 ms.

16. A system for extracting an audio object from at least two audio input signals, the system comprising a control unit configured to carry out the method according to claim 1.

17. The system according to claim 16, further comprising:

- a first microphone for receiving the first audio input signal; and
- a second microphone for receiving the second audio input signal, the first and second microphone being connectable to the system such that the audio input signals of the microphones are transmitted to the control unit.

18. The system according to claim 16, wherein the system is a component of a mixing console.

19. A non-transitory computer-readable medium storing a computer program having program code thereon that, when executed on a computer or a corresponding computing unit or on a control unit of a system, causes the computer, the computing unit or the control unit to carry out the method according to claim 1.

* * * * *